Figure 3:
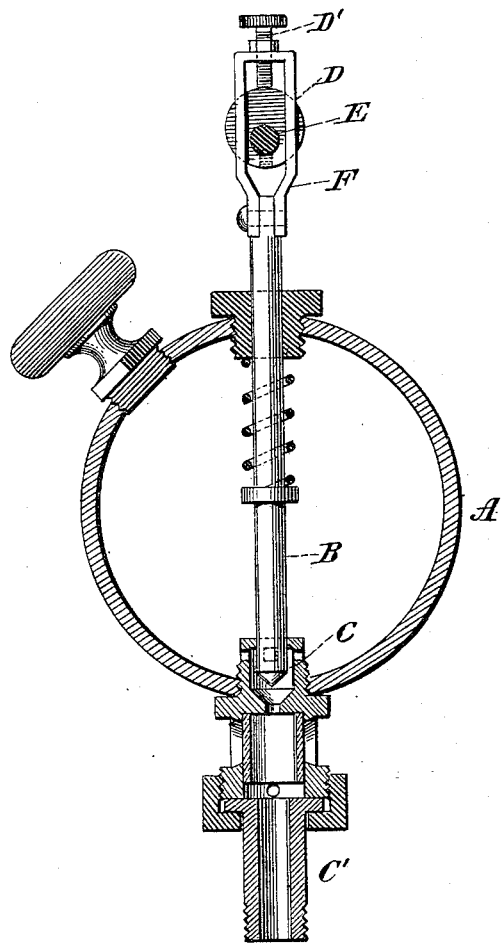

No. 860,931. PATENTED JULY 23, 1907.
W. MONTFORT.
MULTIPLE OILER.
APPLICATION FILED DEC. 13, 1905.
2 SHEETS—SHEET 1.
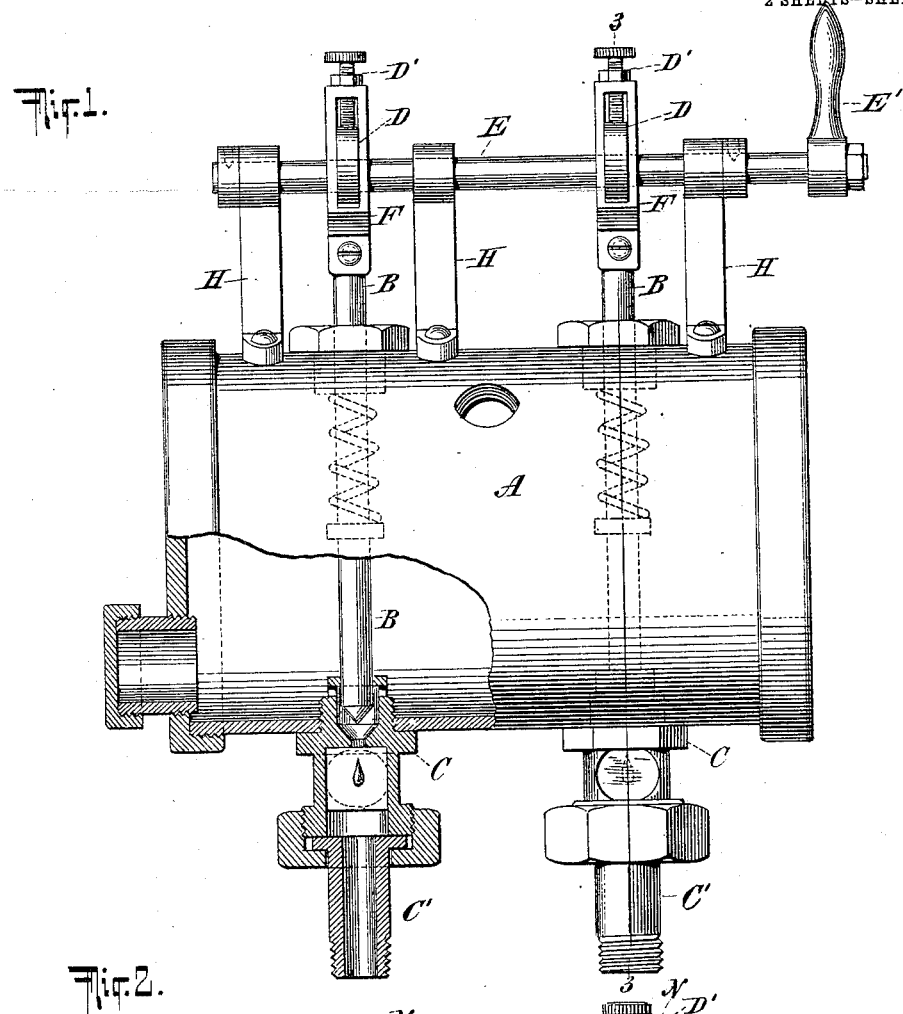
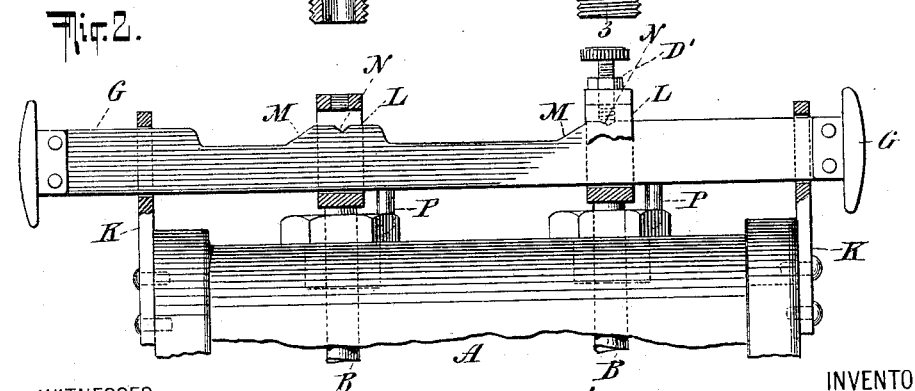

No. 860,931. PATENTED JULY 23, 1907.
W. MONTFORT.
MULTIPLE OILER.
APPLICATION FILED DEC. 13, 1905.

2 SHEETS—SHEET 2.

WITNESSES:

INVENTOR
William Montfort
BY
Charles S. Williams
ATTORNEY

UNITED STATES PATENT OFFICE.

WILLIAM MONTFORT, OF NEWBURGH, NEW YORK.

MULTIPLE OILER.

No. 860,931.  Specification of Letters Patent.  Patented July 23, 1907.

Application filed December 13, 1905. Serial No. 291,642.

*To all whom it may concern:*

Be it known that I, WILLIAM MONTFORT, a citizen of the United States, residing at Newburgh, in the county of Orange and State of New York, have invented a new and useful Multiple or Magazine Oiler, of which the following is a specification.

My invention relates to a multiple oiler in which several oil valves are attached to one oil reservoir and arranged to allow of the starting or stopping simultaneously of the flow of oil through the oil valves.

The objects of my invention are: 1. To provide a multiple oiler in which, upon the starting of the mechanism to be oiled, all the oil valves may be caused to flow at once by one action on the part of the engineer, and not as usually done in the case of multiple oilers by turning on each individual oil valve. 2. To provide a multiple oiler in which, upon the stopping of the mechanism to be oiled, all the oil valves may be stopped at once by one action on the part of the engineer, thus preventing further flow and waste of oil, and not as usually done in the case of multiple oilers by turning off each individual valve. 3. To provide a multiple oiler in which the amount of flow through the oil valves may be regulated by the engineer and when so regulated a portion of the oil valves may be allowed to continue to flow, either at full capacity or in lesser degree, and a portion of them closed by one action on the part of the engineer. 4. To provide a multiple oiler which shall attain these objects and yet be simple in construction and cheap to manufacture.

I accomplish these objects by the device illustrated in the accompanying drawings in which similar letters are used to refer to similar parts throughout the views.

Figure 1 is a side view of my multiple oiler with the oil reservoir or magazine partly broken away, the oil valves being shown as flowing. Fig. 2, is a detail side view of a modification of my multiple oiler, the oil valves being open. Fig. 3, is a vertical cross section of my multiple oiler on the line 3—3 of Fig. 1, the supply cap being in place on the oil reservoir.

My multiple oiler is provided with the oil reservoir or magazine A, valve stems B B, valves C C, with drain pipes or outlets C' C', cams D D, and a shaft or movable member E with handle E' Fig. 1.

The valve stems B B are placed partly within the oil reservoir and at their upper ends pass through guide plugs in the top of the oil reservoir, and are arranged at their lower ends to fit the valve seats. Around each valve stem B there is a spiral spring bearing at one end against a collar on the lower portion of the valve stem and bearing at its other end on the under side of the guide plug, with a tendency to close the valve.

To the upper end of each valve stem B, a yoke F is attached and through these yokes F F, the shaft or rod E passes and is supported by brackets H H, attached to the top of the oil reservoir, these brackets being so con-
structed as to allow the rod E to turn by means of the handle E'. Fixedly attached to the rod E and turning with it are rotary cams D D, arranged at right angles to the rod E and held in place in cross-slots through the yokes F F, so that the tops of the cams D D, may be brought in contact, with adjusting set screws D' D' extending downward through the yokes F F, thus lifting the yokes F F, when the rod E is turned and with them the valve stems B B, from the valve seats. The length of the slots in the yokes F F, in which the cams D D are held is sufficient to allow of a different adjustment of the pressure on each cam by means of its set screw, thus allowing a different lift to each valve stem so that some valves may be permitted to flow while others are closed.

In the modified form of my multiple oiler (Fig. 2) a flat rod or shaft G is provided, supported by and sliding horizontally in brackets K K, attached to the top of the oil reservoir, the valves, spiral springs and valve stems being arranged the same as in the other form of my multiple oiler, except that the valve stems B B, have at their upper ends yokes L L, adapted to allow the flat shaft G to slide through them. The yokes L L, are provided with adjusting set screws similar to those used on the other form of my multiple oiler.

The flat shaft G has on its upper edge incline cams M M, and notches N N, the notches N N being arranged to receive the adjusting set screws D' D', and prevent the slipping of the shaft G. The flat shaft G, rests on its lower edge, on pins P P, placed on the nuts of the guide plugs on the top of the oil reservoir, the object of the pins being merely to serve as a rest and guide for the shaft G.

The operation of my multiple oiler is as follows: The adjusting set screws D' D' are regulated to bear upon the cams D D to lift the yokes F F and with them the valve stems B B from the valve seats and allow of the flow of oil, Fig. 1, and a turn of the handle of the shaft E will cause them to operate simultaneously. A turn of the handle of the shaft E in the other direction will release the pressure of the set screws upon the cams D D, giving effect to the closing action of the spiral springs around the valve stems B B and shutting off the flow. If the adjustment of the set screws is such a portion of the oil valves may be allowed to flow and a portion shut off by a similar movement of the handle of the shaft E.

In the modified form of my multiple oiler the flat shaft G, is pushed through the yokes L L, the set screws D' D' having been adjusted to come in contact with the incline cams M M, lift the valve stems B B from the valve seats and allow flow. If the shaft G is pushed or pulled in the opposite direction it will release the bearing of the adjusting set screws D' D' upon the incline cams M M, and shut off the flow of oil. By different adjustment of the set screws D' D' some of the oil valves may be allowed to flow and some of them closed in response to the action of the shaft G.

By using the revolving or sliding shaft valve stems, yokes thereon and cams as described, in addition to the advantage of not having to turn on or off each separate oil valve, as in the case of the usual multiple oiler, I do away with the necessity for sleeves or hollow spindles inclosing valve stems for the oil valves, thus simplifying the construction and lessening the cost of manufacture.

While for convenience in the drawings only two oil valves are shown it is obvious that the number of oil valves which may be used in my multiple oiler is only limited by the size of the oil reservoir in which they are placed.

Having fully described my invention what I claim and desire to protect by Letters Patent is 1. A multiple oiler comprising the oil reservoir, the valves within said reservoir, the valve stem springs with a tendency to close the valves, the valve stems having upon their upper ends the yokes and the movable member having on it the cams arranged in said yokes and adapted by contact with the heads of the valve stems to actuate the valves, substantially as set forth.

2. The combination of the oil reservoir, the valves within said reservoir, the valve stem springs with a tendency to close the valves, the valve stems having upon their upper ends the yokes, the movable member having on it the cams arranged in said yokes and adapted by contact with the heads of the valve stems to actuate the valves and the means regulating the lift of the valve stems by contact with the cams on said movable member, substantially as set forth.

3. The combination of the oil reservoir, the valves within said reservoir, the valve stem springs with a tendency to close the valves, the valve stems having the yokes on their upper ends, the movable member having the cams thereon and the set screws adapted to come in contact with the cams on said movable member, substantially as set forth.

WILLIAM MONTFORT.

Witnesses:
L. DICKERSON,
R. KETCHAM.